April 17, 1945. J. D. RYAN 2,374,040

METHOD OF PRODUCING LAMINATED GLASS STRUCTURES

Filed Oct. 23, 1941  2 Sheets-Sheet 1

Inventor
JOSEPH D. RYAN,
By Frank Fraser
Attorney

April 17, 1945. J. D. RYAN 2,374,040
METHOD OF PRODUCING LAMINATED GLASS STRUCTURES
Filed Oct. 23, 1941 2 Sheets-Sheet 2

Inventor
JOSEPH D. RYAN,
By Frank Fraser
Attorney

Patented Apr. 17, 1945

2,374,040

UNITED STATES PATENT OFFICE 2,374,040

METHOD OF PRODUCING LAMINATED GLASS STRUCTURES

Joseph D. Ryan, Toledo, Ohio, assignor to Libbey-Owens-Ford Glass Company, Toledo, Ohio, a corporation of Ohio Application October 23, 1941, Serial No. 416,223

8 Claims. (Cl. 154—2.81)

The present invention relates broadly to the manufacture of laminated glass structures and more particularly to an improved method of compositing the laminations in an autoclave.

This invention is applicable, generally, to the manufacture of all types of laminated glass structures comprising two sheets of glass and an interposed layer of thermoplastic adherent thereto. However, by way of example, the invention is herein illustrated and described in the production of that type of laminated glass structure in which the area of the plastic interlayer is greater than the area of the glass sheets so that it extends beyond the edges of said sheets to provide a flexible attaching flange.

This type of extended plastic-laminated glass is adapted to be mounted in the opening to be glazed by clamping the extended portion only of the plastic in or upon the supporting frame as distinguished from clamping the marginal portions of the glass sheets. Such a structure is of particular utility in glazing openings in airplanes and other aircraft where the requirements are unusually stringent, although it may be used in glazing any window or windshield construction.

By clamping the flexible attaching flange only, the laminated glass structure has a certain resiliency or freedom of movement relative to the supporting frame whereby torsion and shock to which the airplane may be subjected will be "cushioned" and for all practical purposes will not be transmitted directly to the glass, thereby reducing or eliminating the tendency of cracking or shattering thereof from such cause. Otherwise stated, by so mounting the laminated structure it is possible to get the benefit of the resiliency or ability to give on the part of the plastic so that when the plane is in flight and twists, weaves or is subjected to varied pressure differentials the glass will not tend to break, because of its ability to "float" without introduction of localized strains.

Heretofore, one way of making this type of laminated structure has been to assemble the glass and plastic laminations to be joined and subject them to a relatively light initial or preliminary pressing, such as for example in a platen press, to exclude air from between the laminations and secure them together so that they may be handled as a unit without danger of slippage relative to one another. The prepressed assembly or "sandwich" is then inserted in a rubber bag from which the air is exhausted; the rubber bag and its contents being then placed in an autoclave and subjected to the direct action of a heated fluid under pressure to effect the final compositing of the laminations. The fluid used in the autoclave usually consists of an oil of the petroleum type. However, the use of rubber bags is not entirely satisfactory because the rubber undergoes rapid deterioration in contact with the autoclave oils, as a result of which they can be used only a comparatively few times. This, coupled with the fact that the rubber bags are quite expensive, results in this method of autoclaving being very costly.

The present invention has to do with the provision of an improved method of autoclaving wherein the use of rubber bags is eliminated and being characterized by the provision of a flexible container for the glass-plastic assembly formed of a material which is not only considerably less expensive than the rubber bags but also highly resistant to penetration by the autoclave oils.

Another object of the invention is the provision of an improved flexible container for the glass-plastic assembly which can be easily and quickly associated therewith and which will conform closely to the outline of the glass-plastic assembly when the air is exhausted therefrom.

Other objects and advantages of the invention will become more apparent during the course of the following description, when taken in connection with the accompanying drawings.

In the drawings, wherein like numerals are employed to designate like parts throughout the same:

With reference now to the drawings, the laminated structure herein disclosed by way of example comprises two sheets of glass 10 and 11 and an interposed layer of thermoplastic 12 bonded to the glass sheets to provide a unitary structure. It will be noted that the area of the glass sheets is relatively less than the area of the plastic interlayer so that the plastic extends beyond the edges of the glass sheets, as indicated at *a* to provide a flexible attaching flange by which the structure may be mounted in or upon a suitable supporting frame.

The glass sheets 10 and 11 may consist of ordinary plate or window glass and may be either fully tempered or semi-tempered or any desired combination of glass sheets may be used. The plastic interlayer 12 may be formed of a polyvinyl acetal resin and one such resin which has been used is polyvinyl butyr acetal resin plasticized with 37½ parts dibutyl sebacate per 100 parts of resin by weight. However, different plastics varying in thickness and physical characteristics may be employed as the invention is not limited to the use of any particular resin, class of resins, cellulosic derivatives or the like. In selecting the glass and plastic, however, consideration may well be given to the use to which the finished structure is to be put.

Figure 5:
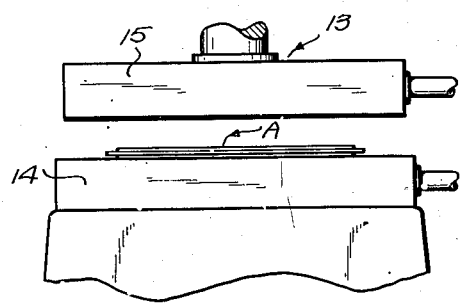
Fig. 5 is a diagrammatic view of a platen press in which the several laminations may be subjected to a relatively light or initial pressure treatment.

The polyvinyl acetal resins, when suitably plasticized, have the capacity of being bonded directly to cleaned glass sheets upon the application of heat and pressure without the employment of any intermediate layers of adhesive or the like. The plastic interlayer 12 is placed between the glass sheets 10 and 11 to form a "sandwich" and subjected first to a relatively light initial or preliminary pressing, such as in a platen press 13 (Fig. 5). The glass-plastic assembly is designated by the letter A and is positioned between the stationary and movable press platens 14 and 15. A satisfactory prepressing cycle in the platen press is a temperature of 250 degrees Fahrenheit for four minutes using a pressure of 50 pounds per square inch calculated on the glass surface, although this prepressing cycle can be varied as desired depending upon the type of plastic used.

As an alternative preliminary pressing apparatus, the glass-plastic assembly can be passed between one or a plurality of pairs of nipping rolls of yieldable, compressible material, such as rubber, rubber composition or the like. In such case, the assembly may be heated slightly and then passed between the nipping rolls to exclude air and to give temporary adhesion to keep the glass-plastic laminations in proper alignment.

Figure 9:
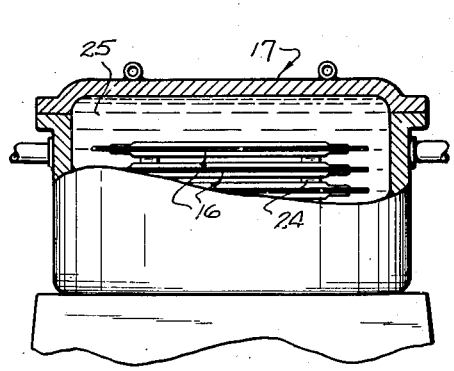
Fig. 9 is an elevation, partially in section, of an autoclave in which the flexible container and prepressed laminated structure are received and subjected to final pressure treatment.
Figure 8:
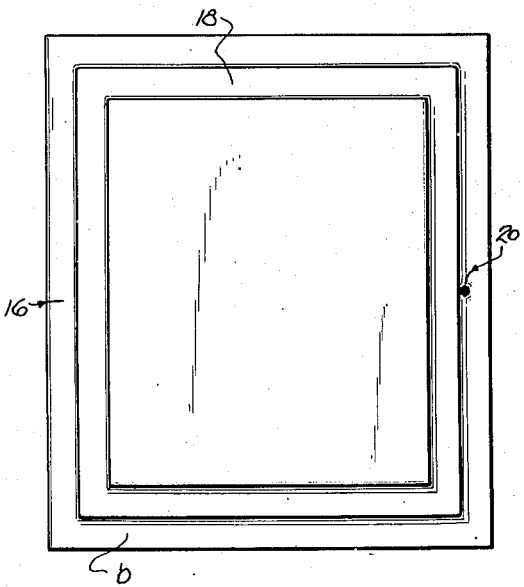
Fig. 8 is a plan view of Fig. 7.

Following the prepressing operation, the glass-plastic assembly is placed in a flexible container designated in its entirety by the numeral 16 (Figs. 6 and 7), after which the container and its contents are placed in an autoclave 17 (Fig. 9) and subjected to final pressure treatment. In accordance with this invention, the flexible container 16 is formed from a polyvinyl alcohol material, and while the invention is not restricted to the use of material of any specific thickness, I might mention that polyvinyl alcohol material having a thickness of .005 of an inch has been used with satisfactory results. This material is highly resistant to penetration by oils of the petroleum type ordinarily used in autoclaving and has the advantage that it can be obtained in sheeting form, much like Cellophane, and simply wrapped around the glass-plastic assembly.

Figure 6:
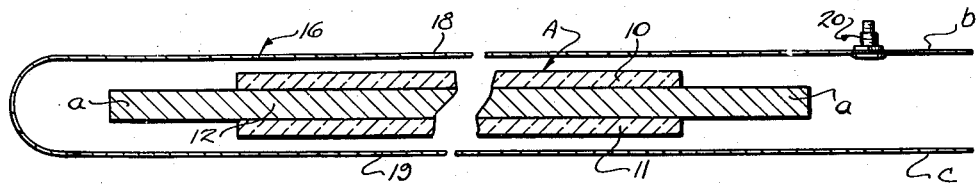
Fig. 6 is a transverse section through the prepressed laminated structure and the improved flexible container therefor.
Figure 7:
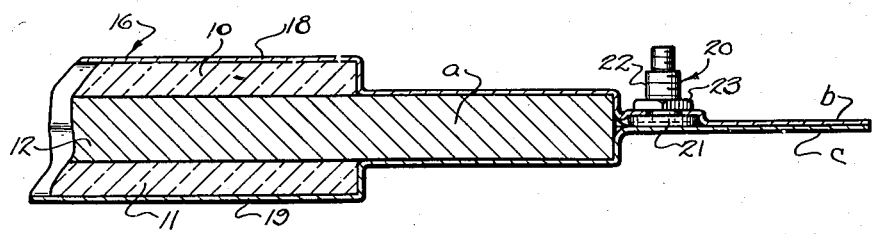
Fig. 7 is an enlarged transverse section showing the way in which the flexible container fits the prepressed laminated structure after the air is exhausted therefrom.

In practice, the glass-plastic assembly is laid upon a flat sheet of the polyvinyl alcohol material and the sheet then folded over the assembly, as shown in Fig. 6, to form a container having the top and bottom walls 18 and 19 respectively between which the glass-plastic assembly is received. The free marginal portions *b* and *c* of the top and bottom walls 18 and 19 of the container extend beyond the assembly at three sides thereof and are secured together as in Fig. 7 to form a sealed container. The polyvinyl alcohol material will adhere to itself simply by wetting with water, so that in order to close the container it is simply necessary to moisten the marginal portions *b* and *c* of the top and bottom walls thereof and press them tightly together.

The interior of the container 16 is then evacuated, and this may be accomplished by providing a valve mechanism 20 similar to that employed in the construction of inner tubes so that the air may be removed by the use of a vacuum pump in the ordinary way. Thus, the valve 20 may include a base 21 provided with a shank 22 upon which is threaded a nut 23. The shank 22 can simply be inserted through an opening in one wall of the container and secured thereto by the nut 23.

The flexible container 16 and its contents are then placed in the autoclave 17 and, as shown, a plurality of assemblies may be supported in spaced relation upon a rack 24 within said autoclave. A heated fluid 25, ordinarily consisting of a petroleum type oil, is used in the autoclave to apply the desired heat and pressure to the glass-plastic laminations. By way of example, the glass-plastic laminations may be subjected to a pressure of about 225 pounds per square inch at a temperature of 260 degrees Fahrenheit for a period of approximately fifteen minutes. It is preferred that the laminations be cooled in the autoclave under pressure. Obviously, suitable heat exchanger means and pressure inducting means are used in connection with the autoclave, which mechanisms are well known in the art and are not illustrated in the drawings.

I have found that a flexible container of polyvinyl alcohol material serves to effectually protect the glass-plastic assembly from the autoclave oils during pressure treatment thereof in the autoclave. This is of especial advantage when making the extended plastic-laminated glass herein disclosed, as it is necessary to avoid contact of the autoclave oils with the extended plastic to prevent loss of plasticizer, wrinkling, distortion, etc. If the extended portion of the plastic interlayer is such that it tends to adhere too tightly to the polyvinyl alcohol sheeting, an interlayer of Cellophane or cellulose acetate of non-adhering character can first be placed over the protruding plastic.

When making curved or bent laminated safety glass, the glass-plastic laminations can be assembled and then placed directly within the flexible container 16. The air can then be exhausted from the container, whereupon the atmospheric pressure will serve to maintain the laminations in properly assembled relation. The container and its contents can then be heated in a suitable oven to effect the desired prepressing of the laminations, after which the container and prepressed assembly can be transferred to the autoclave. Another advantage in using a container of polyvinyl alcohol material is that it is transparent so that the glass-plastic assembly can be viewed therethrough. This is of importance when making bent or curved sheets according to the method set forth above, since it can be readily determined by an attendant when the laminations have been properly prepressed without the necessity of removing them from the container.

The finished laminated structure may be mounted by clamping the extended portion *a* of the plastic interlayer 12 in a frame 26 (Fig. 3) and which will be herein described as forming part of an airplane, although it may obviously constitute a part of any window or windshield construction. The skin of the plane is designated by the numeral 27 and the plastic attaching flange a overlaps the inner surface of the skin and is clamped thereagainst by plates 28 secured in place by screws, bolts, or other suitable fastening elements 29. As shown, a relatively small gap or space 30 is left between the peripheral edges of the laminated structure and the inner edges of the supporting frame to permit the desired freedom of movement of the laminated structure relative to the frame without binding.

Since the plastic attaching flange a only is clamped in the frame 26, it will be apparent that the laminated structure will be permitted a certain amount of floating movement to and fro in the opening due to the resiliency or yieldability of the plastic. Because of this, the liability of breaking or shattering of the glass resulting from a weaving and twisting of the ship proper or a differential in air pressure between the inside and outside of the plane will be minimized.

Figure 1:
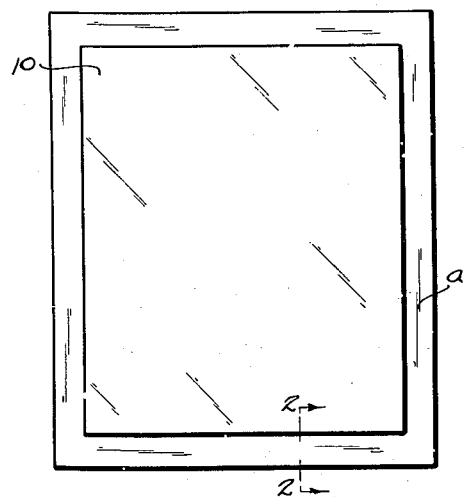
Fig. 1 is a face view of a laminated glass structure made in accordance with the invention.
Figure 2:
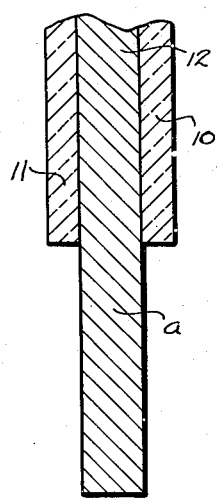
Fig. 2 is a transverse section therethrough taken on line 2—2 of Fig. 1.
Figure 3:
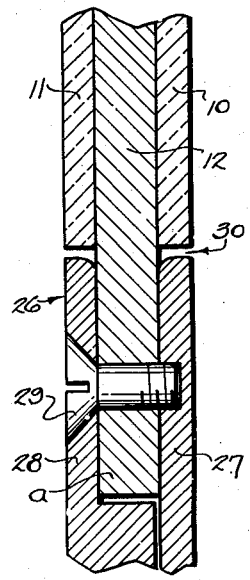
Fig. 3 is a transverse section through the laminated structure and mounting therefor.
Figure 4:
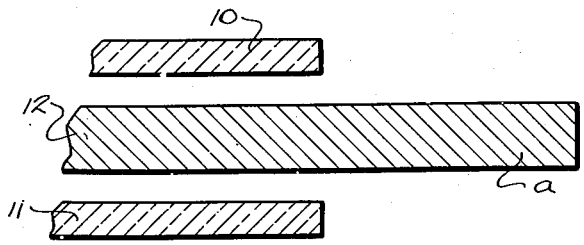
Fig. 4 is a diagrammatic sectional view showing the several laminations to be joined in properly assembled relation but spaced from one another.

Another feature of this type of structure and mounting therefor is that there is provided a so-called "flush" type of installation which is of particular advantage when used in airplanes. Thus, as shown in Fig. 3, the outer surface of the outer glass sheet 10 is flush with the outer surface of the skin 27 of the plane so as not to break the streamlined surfaces of the plane whereby wind resistance is materially reduced.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of producing laminated safety glass including two sheets of glass and an interposed layer of thermoplastic adherent thereto, which comprises arranging the glass and plastic laminations in properly assembled relation to form a "sandwich," placing the sandwich in a fluid-tight flexible container formed from a polyvinyl alcohol material, exhausting the air from said container, and then subjecting the container and its contents to the action of fluid under pressure in an autoclave to effect the compositing of the laminations.

2. The method of producing laminated safety glass including two sheets of glass and an interposed layer of thermoplastic adherent thereto, which comprises arranging the glass and plastic laminations in properly assembled relation to form a "sandwich," wrapping a single sheet of polyvinyl alcohol material around the sandwich to form a fluid-tight container, exhausting the air from said container, and then subjecting the container and its contents to the action of fluid under pressure in an autoclave to effect the compositing of the laminations.

3. The method of producing laminated safety glass including two sheets of glass and an interposed layer of thermoplastic adherent thereto, which comprises arranging the glass and plastic laminations in properly assembled relation to form a "sandwich," subjecting the sandwich to a relatively light preliminary pressing, placing the prepressed sandwich in a fluid-tight flexible container formed from a polyvinyl alcohol material, exhausting the air from said container, and then subjecting the container and its contents to the action of fluid under pressure in an autoclave to effect the compositing of the laminations.

4. The method of producing laminated safety glass including two sheets of glass and an interposed layer of thermoplastic adherent thereto, which comprises arranging the glass and plastic laminations in properly assembled relation to form a "sandwich," subjecting the sandwich to a relatively light preliminary pressing, wrapping a single sheet of polyvinyl alcohol material around the prepressed sandwich to form a fluid-tight container, exhausting the air from said container, and then subjecting the container and its contents to the action of fluid under pressure in an autoclave to effect the compositing of the laminations.

5. In the method of producing laminated safety glass including two sheets of glass and an interposed layer of thermoplastic adherent thereto and wherein the glass-plastic laminations are subjected to the action of fluid under pressure in an autoclave to effect the compositing thereof, the step of protecting the glass-plastic laminations from direct contact with the autoclave fluid by placing them in a fluid-tight flexible container formed from a polyvinyl alcohol material.

6. In the method of producing laminated safety glass including two sheets of glass and an interposed layer of thermoplastic adherent thereto and wherein the glass-plastic laminations are subjected to the action of fluid under pressure in an autoclave to effect the compositing thereof, the step of protecting the glass-plastic laminations from direct contact with the autoclave fluid by wrapping a single sheet of polyvinyl alcohol material around the said glass-plastic assembly and securing the free edges of said sheet to one another by wetting with water to provide a sealed container.

7. In the method of producing laminated safety glass including two sheets of glass and an interposed layer of thermoplastic adherent thereto, with the layer of plastic extending beyond the edges of the glass sheets, and in which the glass-plastic laminations are subjected to the action of fluid under pressure in an autoclave to unite the same, the step of protecting the extended portion of the plastic interlayer from direct contact with the pressing fluid by applying thereto a fluid-tight covering of polyvinyl alcohol material.

8. In the method of producing laminated safety glass including two sheets of glass and an interposed layer of thermoplastic adherent thereto, with the layer of plastic extending beyond the edges of the glass sheets, and in which the glass-plastic laminations are subjected to the action of fluid under pressure in an autoclave to unite the same, the step of protecting the extended portion of the plastic interlayer from direct contact with the pressing fluid by wrapping a single sheet of polyvinyl alcohol material around the glass-plastic laminations and securing the free edges of said sheet to one another by wetting with water to provide a sealed container.

JOSEPH D. RYAN.